United States Patent Office 3,520,913
Patented July 21, 1970

3,520,913
PROCESS FOR THE PRODUCTION OF LOWER SATURATED ALIPHATIC NITRILES
Naoya Kominami, Tokyo, Hitoshi Nakajima, Urawa-shi, and Nobuhiro Tamura, Tokyo, Japan, assignors to Asahi Kasei Kogyo Kabushiki Kaisha, Osaka, Japan
No Drawing. Continuation-in-part of application Ser. No. 519,014, Jan. 6, 1966. This application Dec. 18, 1967, Ser. No. 691,140
Claims priority, application Japan, Jan. 12, 1965, 40/1,178; June 4, 1965, 40/32,670; Oct. 5, 1965, 40/60,502; Oct. 30, 1965, 40/66,321
Int. Cl. C07c 121/04
U.S. Cl. 260—465.3    5 Claims

ABSTRACT OF THE DISCLOSURE

The production of lower saturated aliphatic nitriles (i.e. propionitrile, isobutyronitrile or normal butyronitrile) in high selectivity by passing a gas mixture containing a lower olefinic hydrocarbon (i.e. ethylene or propylene) and hydrogen cyanide at a temperature of from 150 to 450° C. over rhodium or a compound of rhodium as catalyst to effect catalytic addition reaction.

---

This application is a continuation-in-part of copending application, Ser. No. 519,014, filed on Jan. 6, 1966 now abandoned.

This invention relates to a process for producing lower saturated aliphatic nitriles (i.e. propionitrile, isobutyronitrile or normal butyronitrile) in high selectivity by passing a gas containing a lower olefinic hydrocarbon (i.e. ethylene or propylene) and hydrogen cyanide at a temperature of from 150 to 450° C. over a catalyst to effect a catalytic addition reaction according to the equation:

$$C_nH_{2n} + HCN \rightarrow C_nH_{2n+1}CN \qquad (1)$$

(wherein $n$ is an integer of 2 to 3).

As used herein, the term "high selectivity" means that in the product, the proportion of the desired lower saturated aliphatic nitrile produced from the starting olefin (propionitrile from ethylene and butyronitriles from propylene) is high in relation to by-products such as acetonitrile.

Among the processes hitherto proposed for producing lower saturated aliphatic nitriles from lower olefinic hydrocarbons and hydrogen cyanide there is a process carried out in the liquid phase under a high pressure using cobalt carbonyl as a catalyst (J. Am. Chem. Soc. 76, 5364); a process carried out in the gas phase using active alumina or the like as a catalyst (United States Pat. No. 2,455,-995); a process carried out in the gas phase at an elevated temperature of 475° C. to 700° C. using a noble metal of Group VIII as a catalyst (United States Pat. No. 3,057,-906); a process using nickel or cobalt metal or a cyanide thereof as a catalyst (British Pat. No. 687,014); a process using finely divided metallic palladium supported on gamma alumina as a catalyst (United States Pat. No. 3,278,576); and a process using finely divided metallic nickel as a catalyst (United States Pat. No. 3,278,575).

Of the above processes, the process using cobalt carbonyl as a catalyst suffers from the disadvantages that the catalyst is required in large amount and is deactivated in each single operation, and the regeneration of the catalyst is difficult and expensive. The process using active alumina or the like as a catalyst is not only markedly low in yields of lower saturated aliphatic nitriles, but is not applicable to ethylene. The process of United States Pat. No. 3,057,-906 using a nobel metal of Group VIII as a catalyst is markedly low in selectivity, acetonitrile being by-produced in large quantities. The process using palladium or nickel metal as a catalyst is good in yield and selectivity, but the catalyst is quickly diminished in activity and must be repeatedly regenerated.

According to the present invention, the process for producing lower saturated aliphatic nitriles comprises subjecting a gas containing ethylene or propylene and hydrogen cyanide to a vapor phase catalytic addition reaction at a temperature in the range of 150 to 450° C. in the presence of rhodium or a compound of rhodium as a catalyst.

The process is highly selective and produces the desired nitriles in high yield.

At temperatures above 450° C. the selectivity is reduced, acetonitrile being by-produced in large amounts, whereas at temperatures below 150° C., the yield of the desired lower saturated aliphatic nitriles in one pass is remarkably reduced, as shown in Table I below. This phenomenon is also observed in the case of employing propylene, other space velocities or other starting gas compositions.

TABLE I.—RHODIUM CATALYST

| Temperature (° C.) | One pass yield of propionitrile based on hydrogen cyanide (percent) | Selectivity of propionitrile based on hydrogen cyanide (percent) |
|---|---|---|
| 100 | 0 | -- |
| 150 | 1 | 95 |
| 200 | 4 | 93 |
| 250 | 16 | 91 |
| 300 | 35 | 90 |
| 400 | 60 | 86 |
| 450 | 70 | 81 |
| 500 | 53 | 58 |
| 600 | 31 | 38 |
| 700 | 8 | 10 |

Catalyst: 10 ml. of rhodium-γ-alumina. Rhodium content: 0.05 wt. percent.
Space velocity: 218 hr.$^{-1}$.
Starting gas composition: Ethylene:hydrogen cyanide:nitrogen=5:2:5 (by mole ratio).

Table II below shows the comparison in catalytic activity of palladium catalyst and rhodium catalyst with a change of reaction time. It will be readily seen that the rhodium catalyst is superior to the palladium catalyst. This fact is also observed in the case of employing the reaction conditions other than those set forth in Table II.

TABLE II.—COMPARISON IN CATALYST ACTIVITY BETWEEN PALLADIUM AND RHODIUM

| | One pass yield of propionitrile based on hydrogen cyanide (percent) | |
|---|---|---|
| Reaction time (hr.) | Palladium catalyst | Rhodium catalyst |
| 0.5 | 55 | 57 |
| 1 | 56 | 60 |
| 2 | 51 | 59 |
| 3 | 47 | 59 |
| 5 | 40 | 57 |
| 10 | 25 | 54 |

Catalyst:
10 ml. of palladium-γ-alumina. Palladium content: 0.05 wt. percent.
10 ml. of rhodium-γ-alumina. Rhodium content: 0.05 wt. percent.
Reaction temperature: 350° C.
Space velocity: 218 hr.$^{-1}$
Starting gas composition: Ethylene:hydrogen cyanide=3:1 (by mole ratio).

As the catalyst, rhodium can be used in the form of the metal or as compounds thereof. It is believed that all compounds of palladium and rhodium are catalytically active in the process.

Examples of compounds of rhodium which may be used are the halides such as the chloride, bromide or iodide, carboxylates such as oxalate or acetate, and cyanide.

The catalyst may be prepared by any of the conventional methods such as immersion or mixing. The use of a carrier is not essential but is preferable. Examples of carriers are active carbon, alumina, silica, silica-alumina, titania, boria and alumina-boria.

dium bromide, rhodium iodide, rhodium cyanate and rhodium oxalate on a catalyst support prepared in the same manner as in Example 2. The results are shown in Table III below.

TABLE III

| Rhodium compound | Carrier | Rhodium content (wt. percent) | Temp. (°C.) | Space velocity (hr.⁻¹) | Inlet gas mole ratio ||| Hydrogen cyanide conversion (percent) | Propionitrile selectivity [1] (percent) |
|---|---|---|---|---|---|---|---|---|---|
| | | | | | Ethylene | Hydrogen cyanide | Nitrogen | | |
| Rhodium chloride | γ-Aluminaboria | 0.033 | 350 | 240 | 3 | 1 | 2 | 40.7 | 89.5 |
| Rhodium bromide | Silica-γ-alumina | 0.015 | 300 | 220 | 5 | 2 | 5 | 7.8 | 90.9 |
| Rhodium iodine | Active carbon | 0.03 | 300 | 350 | 1 | 2 | 7 | 5.1 | 84.4 |
| Rhodium cyanide | Boria | 0.025 | 250 | 160 | 1 | 1 | 0 | 11.8 | 85.3 |
| Rhodium oxalate | γ-Alumina | 0.02 | 300 | 200 | 5 | 2 | 5 | 16.8 | 90.0 |

[1] Mole yield based on converted hydrogen cyanide.

The catalyst may be employed in the form of a fixed bed, movable bed or fluidized bed.

In practicing the process of the present invention, some diminution in catalyst activity may be observed. In such a case, the reaction is discontinued and the catalyst is heated while introducing oxygen or a gas containing molecular oxygen such as air, whereby the catalyst activity is easily restored. This regeneration operation is preferably effected before the activity has fallen to 30% of the maximum activity. The regeneration temperature is preferably in the range 200° C. to 600° C.

The gas may be diluted with an inert gas such as nitrogen, methane, ethane, propane or carbon dioxide, but this is not essential.

The mole ratio of ethylene or propylene to hydrogen cyanide may be about 1:1, or one of them may be used in excess. Generally, however, a mole ratio within a range of from 20:1 to 1:20 is adopted.

The process of the present invention is preferably carried out at atmospheric pressure but may be carried out under superatmospheric pressure.

This invention will be illustrated by the following examples which are in no way limiting upon the scope thereof.

EXAMPLE 1

1.0 g. of rhodium chloride was dissolved in dilute hydrochloric acid. To the solution, 8 g. (=10 ml.) of active carbon were added, and the mixture was evaporated to dryness to provide a catalyst. This catalyst was filled into a reaction tube made of heat-resistant glass of 12 mm. outside diameter which had been placed in a potassium nitrate-sodium nitrate bath maintained at 300° C., and hydrogen was passed into the catalyst for 3 hours to reduce the rhodium chloride to metallic rhodium. Subsequently a gas mixture consisting of ethylene, hydrogen cyanide and nitrogen at a mole ratio of 1:1:3 was passed through at a space velocity of 210 hr.⁻¹. 70.4% of the introduced hydrogen cyanide was converted and 90.6% of the converted hydrogen cyanide became propionitrile.

EXAMPLE 2

1.4 g. of rhodium acetate were dissolved in acetic acid. To the solution, 22 g. (=27.5 ml.) of tablets of γ-alumina of 5 mm. diameter was added, and the mixture was evaporated to dryness to provide a catalyst. This catalyst was filled into a reaction tube and maintained at 350° C. Into the reaction tube, a gas mixture consisting of propylene, hydrogen cyanide and nitrogen at a mole ratio of 2:1:2 was introduced at a space velocity of 260 hr.⁻¹. 31.4% of the introduced hydrogen cyanide was converted, and 79.5% of the converted hydrogen cyanide became isobutyronitrile and 14.4% of the converted hydrogen became normal butyronitrile.

EXAMPLE 3

Propionitrile was produced from ethylene and hydrogen cyanide, utilizing, as catalyst, rhodium chloride, rho-

EXAMPLE 4

1 g. of rhodium bromide was supported on 75 g. (=93.75 ml.) of γ-alumina in the same manner as in Example 1. This catalyst was filled into a reaction tube and maintained at 370° C. and hydrogen was passed into the catalyst for 5 hours to reduce the rhodium bromide to metallic rhodium. Subsequently a gas mixture consisting of ethylene, hydrogen cyanide and nitrogen at a mole ratio of 5:2:5 was passed through at a space velocity of 350 hr.⁻¹. Over 30 minutes after starting the reaction, the conversion of hydrogen cyanide was 61% and the selectivity of propionitrile was 92.3% and over 6 hours after starting the reaction, the conversion of hydrogen cyanide was 54.6% and the selectivity of propionitrile was 93.0% and over 16 hours after starting the reaction, and conversion of hydrogen cyanide was 42.1% and the selectivity of propionitrile was 93.6%. Over 16 hours after the starting of reaction, the process was stopped and the catalyst was heated at 370° C. for 5 hours while introducing air and subsequently reduced with hydrogen. The reaction was carried out utilizing the regenerated catalyst under the same conditions as described above to give 63.7% of conversion of hydrogen cyanide and 92.6% of selectivity of propionitrile over 30 minutes after restarting the reaction and 56.8% of conversion of hydrogen cyanide and 93.6% of selectivity of propionitrile over 6 hours after restarting the reaction.

What is claimed is:

1. A process for producing a lower saturated aliphatic nitrile of the formula

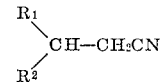

wherein $R^1$ and $R^2$ are hydrogen or methyl, with the proviso that both are not methyl which comprises subpecting a gas mixture containing a lower aliphatic olefin selected from the group consisting of ethylene and propylene, and hydrogen cyanide to a catalytic addition reaction at a temperature of from 150 to 450° C. in the presence of a compound selected from the group consisting of rhodium, and the chloride, bromide, iodide, oxide, hydroxide, acetate, oxalate and cyanide of rhodium as a catalyst.

2. The process of claim 1 wherein the mole ratio of the lower aliphatic olefin to hydrogen cyanide is in the range of from 20:1 to 1:20.

3. The process of claim 1 wherein the catalyst is supported on a carrier selected from the group consisting of active carbon, alumina, silica, silica-alumina, titania, boria and alumina-boria.

4. The process of claim 1 wherein the reaction is effected in the presence of an inert gas selected from the group consisting of nitrogen, methane, ethane, propane and carbon dioxide.

5. The process of claim 1, wherein the catalyst is, when deactivated in the catalytic reaction, regenerated by heating it at a temperature of from 200 to 600° C.

in a stream of a gas selected from the group consisting of oxygen and a molecular oxygen-containing gas.

References Cited

UNITED STATES PATENTS

| | | | |
|---|---|---|---|
| 3,057,906 | 10/1962 | Fierce et al. | 260—465.3 |
| 3,278,575 | 10/1966 | Davis | 260—465.3 |
| 3,278,576 | 10/1966 | Davis et al. | 260—465.3 |
| 3,347,900 | 10/1967 | Gossel et al. | 260—465.3 |
| 3,407,223 | 10/1968 | Kominami et al. | 260—465.3 |
| 3,412,136 | 11/1968 | McClain et al. | 260—465.3 |

JOSEPH P. BRUST, Primary Examiner